United States Patent
Gwan Ho

(10) Patent No.: US 8,342,029 B2
(45) Date of Patent: Jan. 1, 2013

(54) APPARATUS FOR GUARDING PRESSURE SENSOR FOR WASHING MACHINE

(75) Inventor: Ro Gwan Ho, Seoul (KR)

(73) Assignee: Useong Electro Mechanics Co., Ltd., Gyeonggi-Do (KR)

( * ) Notice: Subject to any disclaimer, the term of this patent is extended or adjusted under 35 U.S.C. 154(b) by 722 days.

(21) Appl. No.: 12/571,844

(22) Filed: Oct. 1, 2009

(65) Prior Publication Data

US 2011/0048549 A1    Mar. 3, 2011

(30) Foreign Application Priority Data

Sep. 1, 2009    (KR) .................. 10-2009-0081739

(51) Int. Cl.
*G01L 7/00* (2006.01)
(52) U.S. Cl. .................. 73/706; 8/137; 8/158
(58) Field of Classification Search .................. None
See application file for complete search history.

(56) References Cited

U.S. PATENT DOCUMENTS

| | | | |
|---|---|---|---|
| 5,768,728 A * | 6/1998 | Harwood et al. ............. | 8/158 |
| 2003/0208852 A1 * | 11/2003 | Hardaway et al. ............ | 8/158 |
| 2005/0166334 A1 * | 8/2005 | Clouser ....................... | 8/159 |
| 2006/0010611 A1 * | 1/2006 | Snow .......................... | 8/158 |
| 2009/0120135 A1 * | 5/2009 | Gill et al. .................... | 68/12.05 |
| 2010/0000269 A1 * | 1/2010 | Shin et al. ................... | 68/5 C |
| 2012/0011663 A1 * | 1/2012 | Hanau et al. ................ | 8/137 |

FOREIGN PATENT DOCUMENTS

KR    1995-7460    9/1995

* cited by examiner

*Primary Examiner* — Andre Allen
(74) *Attorney, Agent, or Firm* — Dykema Gossett PLLC

(57) ABSTRACT

An apparatus for guarding a pressure sensor for a washing machine is provided, which adjusts the water level required to wash laundries. The apparatus for guarding a pressure sensor includes a diaphragm built in a space part of a housing to operate in accordance with the water pressure of washing water being supplied through an inlet, a metal core mounted on an upper surface of the diaphragm through a coil spring, a first sensing part installed in a moving path of the metal core to output a signal required for adjustment of a water level of the washing water, a measurement part mounted on an upper surface of the metal core to ascend/descend along an operation path of the coil spring, a second sensing part mounted on an upper side of the space part to sense maximum and minimum positions of the measurement part, and a controller outputting a blocking signal to an inlet path of the inlet. According to the apparatus for guarding a pressure sensor, washing water more than or less than a prescribed amount is prevented from being supplied to the washing machine, and thus a uniform washing process is performed to improve the reliability of the washing machine. Also, the damage or corrosion of electric/electronic sub assembly of the washing machine due to the overflow of the washing water is prevented to prolong the lifespan of the washing machine.

3 Claims, 1 Drawing Sheet

APPARATUS FOR GUARDING PRESSURE SENSOR FOR WASHING MACHINE

BACKGROUND OF THE INVENTION

1. Field of the Invention

The present invention relates to an apparatus for guarding a pressure sensor for a washing machine, which adjusts the water level of washing water being supplied into the washing machine, and more particularly to an apparatus for guarding a pressure sensor for a washing machine, which can block an inflow path of washing water when the pressure sensor malfunctions.

2. Background of the Related Art

In general, a washing machine is an appliance that washes laundries through washing, rinsing, and dehydrating processes by the action of water being supplied into a washing tank and a detergent, and is provided with a pressure sensor that properly adjusts the water supply amount in accordance with a water level preset by a controller or a water level directly set by a user.

The pressure sensor is to adjust the water level of washing water in accordance with the change of an oscillation frequency of an LC oscillation circuit. Since a controller judges whether to operate a water supply device and a drain device and successively outputs on/off signals thereto, the washing water supply amount can be optimized to reduce unnecessary waste of water.

For example, according to a pressure sensor previously filed by the applicant (Korean Patent Publication No. 1995-7460), as shown in FIG. 1, a diaphragm 140 is built in a space part 120 of a housing 110 to operate in accordance with the water pressure of washing water being supplied to an inlet C, a metal core 150 is mounted on an upper surface of the diaphragm 140 to be in close elastic contact with the upper surface of the diaphragm 140 through a coil spring 130, and a first sensing part 160 is installed in a moving path of the metal core 150 to output a signal required for adjustment of a water level of the washing water.

In this case, the first sensing part 160 has a structure that adjusts the washing water supply amount in accordance with a reactance value of a bobbin on which a coil is wound.

Accordingly, when the washing water is supplied to the inlet C of a pressure sensor 100, the metal core 150 mounted on the diaphragm 140 ascends/descends according to the water pressure, and thus the washing water supply amount is adjusted as much as the amount of ascent/descent of the metal core 150 in accordance with an output signal of the first sensing part 160.

However, the pressure sensor 100, which has a structure that adjusts the washing water supply amount in accordance with an output signal of the first sensing part 160, is not provided with a safety device that compensates for malfunction of the first sensing part 160 when such malfunction is generated, and thus it may lose the function of adjusting the water level of washing water, which is the inherent function of the pressure sensor.

In addition, if the washing water more than a prescribed amount is supplied due to the malfunction of the pressure sensor 100, the on/off time of the washing machine may be lengthened or shortened, and further laundries may get tangled or become decolorized or discolored to cause the damage of the laundries themselves.

Accordingly, if the washing water more than or less than the prescribed amount is supplied through the inlet C due to the malfunction of the pressure sensor 100, the water level adjustment function of the pressure sensor is lost, and thus the washing work cannot be smoothly performed. In this case, due to the overflow of the washing water, surrounding environment may be polluted.

SUMMARY OF THE INVENTION

Accordingly, the present invention is directed to an apparatus for guarding a pressure sensor for a washing machine that substantially obviate one or more problems due to limitations and disadvantages of the related art.

It is an object of the present invention to provide an apparatus for guarding a pressure sensor for a washing machine, which can block an inflow path of washing water when the pressure sensor malfunctions.

Additional advantages, objects, and features of the present invention will be set forth in part in the description which follows and in part will become apparent to those having ordinary skill in the art upon examination of the following or may be learned from practice of the present invention. The objectives and other advantages of the present invention may be realized and attained by the structure particularly pointed out in the written description and claims hereof as well as the appended drawings.

In order to achieve the above and other objects, there is provided an apparatus for guarding a pressure sensor for a washing machine, having a diaphragm built in a space part of a housing to operate in accordance with the water pressure of washing water being supplied through an inlet, a metal core mounted on an upper surface of the diaphragm through a coil spring, and a first sensing part installed in a moving path of the metal core to output a signal required for adjustment of a water level of the washing water, according to the present invention, which includes a measurement part mounted on an upper surface of the metal core to ascend/descend along an operation path of the coil spring; a second sensing part mounted on an upper side of the space part to sense maximum and minimum positions of the measurement part; and a controller outputting a blocking signal to an inlet path of the inlet.

According to the apparatus for guarding a pressure sensor for a washing machine as constructed above, washing water more than or less than a prescribed amount is prevented from being supplied to the washing machine, and thus a uniform washing process is performed to improve the reliability of the washing machine. Also, the damage or corrosion of electric/electronic sub assembly of the washing machine due to the overflow of the washing water is prevented to prolong the lifespan of the washing machine.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE PREFERRED EMBODIMENT

The preferred embodiment of the present invention will now be explained in detail with reference to the accompanying drawings.

Figure 1:
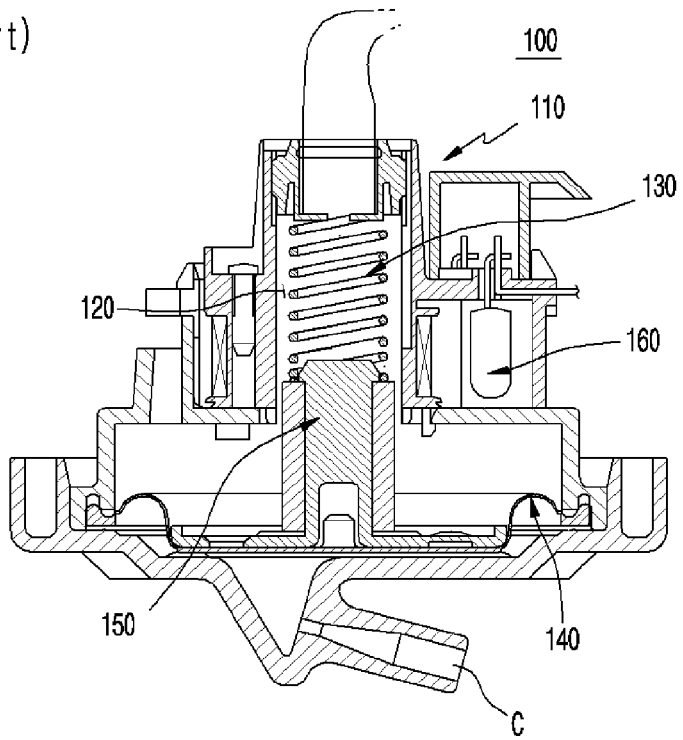
FIG. 1 is a longitudinal sectional view of a conventional pressure sensor for a washing machine.
Figure 2:
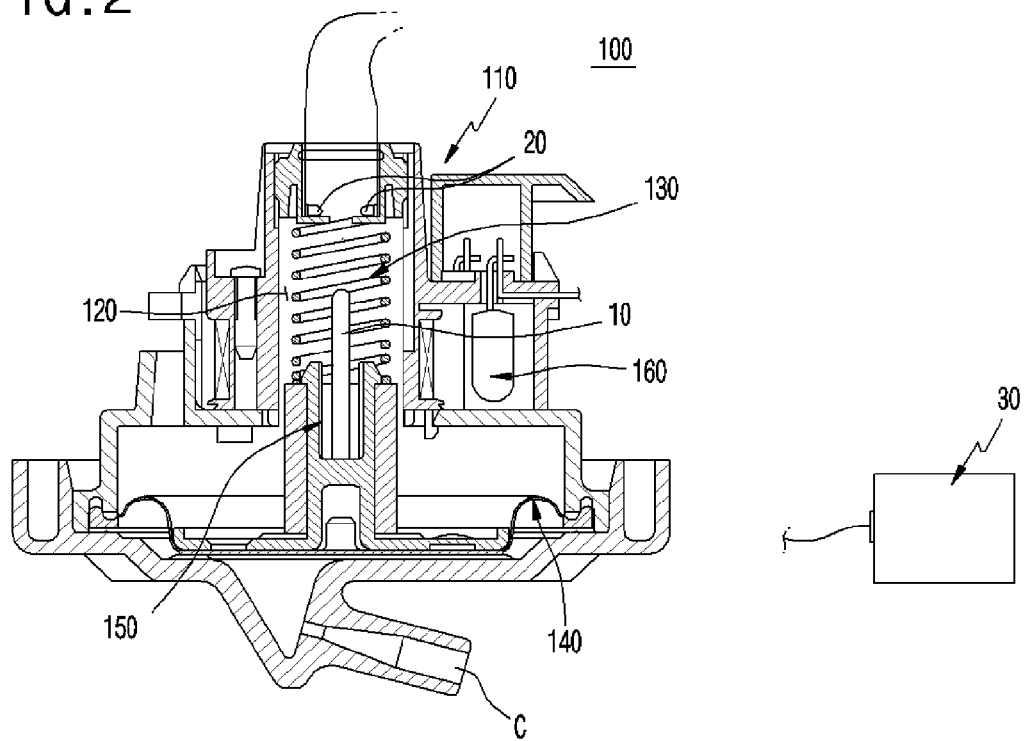
FIG. 2 is a longitudinal sectional view of a pressure sensor for a washing machine according to the present invention.

FIG. 2 is a longitudinal sectional view of a pressure sensor for a washing machine according to the present invention.

The pressure sensor 100 according to the present invention includes a diaphragm 140 built in a space part 120 of a housing 110 to ascend/descend in accordance with the water pressure of washing water being supplied into the housing through an inlet C, a metal core 150 mounted on an upper surface of the diaphragm 140 through a coil spring 130, and a first sensing part 160 installed in a moving path of the metal core 150 to output a signal required for adjustment of a water level of the washing water. The pressure sensor 100 further includes a measurement part 10 mounted on an upper surface of the metal core 150 to ascend/descend along an operation path of the coil spring 130; a second sensing part 20 mounted on an upper side of the space part 120 to sense maximum and minimum positions of the measurement part 10; and a controller 30 outputting a blocking signal to an inlet path of the inlet C.

Here, the present invention is provided by adding the measurement part 10, the second sensing part 20, and the controller 30 to the pressure sensor 100 previously filed by the applicant, and is characterized in that an inlet line of the washing water is blocked when the washing water is abnormally supplied due to the malfunction of the pressure sensor 100.

The housing 110 forms the exterior of the pressure sensor 100, and supports the whole load of the pressure sensor 100. An upper main body and a lower main body are engaged with each other to form the space part 120 of a specified size, which can accommodate various kinds of constituent elements, and the inlet C, which is an inlet path of the washing water, is formed on a lower side of the main body.

In the embodiment of the present invention, it is exemplified that the housing 110 is constructed through mutual engagement of the upper main body and the lower main body. Since the housing 110 may also be constructed through engagement of a left main body with a right main body or through engagement of an upper/lower main body with a left/right main body, the detailed description thereof will be omitted.

The diaphragm 140 is mounted on a bottom surface of the space part 120 to ascend/descend in accordance with the change of the water pressure. That is, the diaphragm 140 ascends/descends in accordance with the washing water being supplied through the inlet C to open the inlet path of the inlet C. Since the material and the fixing method of the diaphragm are well known, the detailed description thereof will be omitted.

The metal core 150 is projected from the upper surface of the diaphragm 140, and is in direct contact with the coil spring 130. In the ascending/descending process of the diaphragm 140, the metal core 150 repeats the ascending/descending process to an extent corresponding to the amount of the washing water being supplied through the inlet C, along with the diaphragm 140.

In the embodiment of the present invention, the metal core 150 is limited to be in direct contact with the coil spring 130. However, the metal core 150 may be engaged with the diaphragm 140 through an intermediate member, and in particular, a spiral groove may be formed thereon to be engaged with the coil spring.

The coil spring 130 is accommodated in the space part 120, and provides a compression force to the metal core 150. An upper end portion of the coil spring 130 is fixed within the space part 120 through a fixing means, and a lower end portion thereof is in direct contact with the metal core 150 so as to elastically guide the ascent/descent of the diaphragm 140.

The first sensing part 160 is accommodated in the space part 120, and is installed at a certain distance from the circumference of the coil spring 130. The first sensing part 160 senses the amount of ascent/descent of the metal core 150, and outputs a frequency signal required for the adjustment of the washing water in accordance with the amount of movement of the metal core 150 and a reactance value of the coil.

In the embodiment of the present invention, the first sensing part 160 is limited to a tool for measuring the change of the reactance value of the coil. However, the first sensing part 160 may be any means for sensing the movement amount of the metal core 150 and the compression force, which comes within the technical categories of the present invention.

The measurement part 10 is accommodated in the space part 120, and ascends/descends along the operation path of the coil spring 130, together with the metal core 150. It is preferable that the measurement part 10 ascends/descends within a winding part of the coil spring 130 in a state that it is engaged with or is formed in a body with the upper surface of the metal core 150.

The second sensing part 20 is mounted on a wall surface of the space part 120, and senses the maximum and minimum positions of the measurement part 10 to output a signal required for the blocking of the inlet path (i.e. water supply valve) of the washing water. It is preferable that the second sensing part 20 is composed of a photo sensor that senses the quantity of light by an interaction of a light-emitting unit and a light-receiving unit.

In the embodiment of the present invention, the sensing means of the measurement part 10 is limited to the photo sensor. However, the sensing part may be any means that can sense the position of the measurement part 10, which comes within the technical categories of the present invention.

The controller 30 receives the signal from the second sensing part 20, and outputs a blocking signal to the inlet path of the inlet C, and preferably, the water supply valve (not illustrated).

Hereinafter, the operation of the pressure sensor as constructed above according to the present invention will be described.

First, if a switch provided in the washing machine is operated, the washing water, the amount of which is set by the water supply valve (not illustrated), is supplied through the inlet C provided on the pressure sensor 100 to adjust the water pressure.

Then, the diaphragm 140 ascends/descends to an extent corresponding to the water pressure of the washing water being supplied to the inlet C, and thus the metal core 150 repeats the ascending/descending process along the space part 120.

In the above-described process, the amount of ascent/descent of the metal core 150 is sensed by the first sensing part 160, and the amount of the washing water being supplied to the inlet C is adjusted in accordance with an output signal of the first sensing part 160.

In addition, since the measurement part 10 simultaneously ascends/descends to an extent corresponding to the amount of ascent/descent of the metal core 150, the amount of ascent/descent of the measurement part 10 is continuously sensed by the second sensing part 20.

If the first sensing part 160 becomes in an abnormal state and the washing water more than the prescribed amount is supplied, the controller 30 receives the signal from the second sensing part 20, and outputs the blocking signal to the water supply valve (not illustrated).

In this case, if the measurement part 10 ascends via the second sensing part 20, the second sensing part 20 senses this by the change of the quantity of light through the light-emitting unit and the light-receiving unit, and outputs the corresponding sensed signal to the controller 30, so that the controller 30 determines whether to block the water supply valve.

Accordingly, if the pressure sensor 100 malfunctions due to the trouble of the first sensing part 160, the water supply valve is blocked, and the washing water is not supplied to the inlet C of the pressure sensor 100 any more.

While the present invention has been described and illustrated herein with reference to the preferred embodiment thereof, it will be understood by those skilled in the art that various changes and modifications may be made to the invention without departing from the spirit and scope of the invention, which is defined in the appended claims.

What is claimed is:

1. An apparatus for guarding a pressure sensor for a washing machine, including a diaphragm built in a space part of a housing to operate in accordance with the water pressure of washing water being supplied through an inlet, a metal core mounted on an upper surface of the diaphragm through a coil spring, and a first sensing part installed in a moving path of the metal core to output a signal required for adjustment of a water level of the washing water, the apparatus comprising:
   a measurement part mounted on an upper surface of the metal core to ascend/descend along an operation path of the coil spring;
   a second sensing part mounted on an upper side of the space part to sense maximum and minimum positions of the measurement part; and
   a controller outputting a blocking signal to an inlet path of the inlet.

2. The apparatus of claim 1, wherein the measurement part is accommodated in a winding part of the coil spring.

3. The apparatus of claim 1, wherein the second sensing part is a photo sensor.

* * * * *